(12) United States Patent
Buijs

(10) Patent No.: US 9,146,158 B2
(45) Date of Patent: Sep. 29, 2015

(54) BEAMSPLITTER CONFIGURATION FOR OPTICAL SUBTRACTION OF SELF EMISSION WITH FOURIER TRANSFORM SPECTROMETER IN DUAL INPUT PORT MODE

(75) Inventor: Henry L. Buijs, Sillery (CA)

(73) Assignee: ABB Inc., Quebec (CA)

(*) Notice: Subject to any disclaimer, the term of this patent is extended or adjusted under 35 U.S.C. 154(b) by 0 days.

(21) Appl. No.: 13/361,577

(22) Filed: Jan. 30, 2012

(65) Prior Publication Data

US 2012/0194822 A1    Aug. 2, 2012

Related U.S. Application Data

(60) Provisional application No. 61/438,506, filed on Feb. 1, 2011.

(51) Int. Cl.
| | | |
|---|---|---|
| *G01J 3/45* | (2006.01) | |
| *G01J 3/453* | (2006.01) | |
| *G01J 3/02* | (2006.01) | |
| *G02B 19/00* | (2006.01) | |
| *G02B 27/10* | (2006.01) | |

(52) U.S. Cl.
CPC .............. *G01J 3/453* (2013.01); *G01J 3/0205* (2013.01); *G02B 19/009* (2013.01); *G02B 19/0028* (2013.01); *G02B 19/0047* (2013.01); *G02B 27/106* (2013.01)

(58) Field of Classification Search
CPC ....... G01J 3/453; G01J 3/4531; G01J 3/4532; G02B 19/0028; G02B 19/0047; G02B 19/009; G02B 27/106
USPC .......................................... 356/450–452, 455
See application file for complete search history.

(56) References Cited

U.S. PATENT DOCUMENTS

| | | | | |
|---|---|---|---|---|
| 5,002,394 | A * | 3/1991 | Auth | 356/451 |
| 5,066,990 | A * | 11/1991 | Rippel | 356/455 |
| 5,587,831 | A * | 12/1996 | Simon et al. | 359/350 |
| 6,233,054 | B1 | 5/2001 | Theriault | |
| 7,135,682 | B1 * | 11/2006 | Lucey | 250/339.02 |
| 2008/0068612 | A1 * | 3/2008 | Manning | 356/452 |

* cited by examiner

Primary Examiner — Michael A Lyons
(74) Attorney, Agent, or Firm — Michael M. Rickin

(57) ABSTRACT

A four port scanning Michelson interferometer suppresses self-emission by using either a beamsplitter that is uncoated or a beamsplitter that has reflection enhancing dielectric coatings in the splitting and combining areas of the substrate on opposite sides of the substrate. Both beamsplitters are fabricated from infrared optical materials that have a predetermined absorptivity in a predetermined wavelength interval which is from 2 μm (5000 cm$^{-1}$) to 13 μm (770 cm$^{-1}$) in the infrared. The optical materials of the uncoated beamsplitter are selected from a group of materials made up of ZnSe, ZnS, CdS, CdTe, Silicon, Germanium or Diamond. The optical materials of the other beamsplitter are selected from a group of materials made up of KBr, KCl, NaCl, CsI, BaF, CaF and the like.

12 Claims, 12 Drawing Sheets

BEAMSPLITTER CONFIGURATION FOR OPTICAL SUBTRACTION OF SELF EMISSION WITH FOURIER TRANSFORM SPECTROMETER IN DUAL INPUT PORT MODE

CROSS REFERENCE TO RELATED APPLICATION

This application claims the priority of U.S. provisional patent application Ser. No. 61/438,506 filed on Feb. 1, 2011, entitled "Beamsplitter Configuration For Optical Subtraction Of Self Emission With Fourier Transform Spectrometer In Dual Input Port Mode" the contents of which are relied upon and incorporated herein by reference in their entirety, and the benefit of priority under 35 U.S.C. 119(e) is hereby claimed.

FIELD OF THE INVENTION

This invention relates to Fourier-transform spectrometers (FTS) and more particularly to a FTS system used in the dual input port mode where one input views a reference field of view against which the second input port permits direct optical subtractive comparison of a second field of view against the reference field of view providing the difference in spectral radiance as the measure.

DESCRIPTION OF THE PRIOR ART

Fourier-transform spectrometers (FTS) have become the tool of choice for use in the infrared region of the spectrum, especially for applications requiring high detection sensitivity, high spectral resolution, wide spectral coverage, precise spectral response and flexibility for system integration. Spectral information provided by the FTS is frequently used to diagnose chemical processes, detect pollutants, monitor atmospheric conditions by remote detection and identify gaseous emissions in addition to many other uses supporting a variety of industrial activities.

The FTS can be used for the in-situ chemical determination of a sample held in a sampling device. The sample is illuminated by a luminous source to provide a measure of the spectral transmittance of the sample. The FTS can also be used to determine chemical composition or surface emission characteristics by remote sensing via spectro-radiometry. Thermal radiance principally in the long wave infrared is emitted by a surface or a sample of air or other gas by virtue of its non-zero absolute (Kelvin) temperature and can be intercepted at a distance and spectrally analyzed without the need for a luminous source. To obtain a quantitative measure of the surface emitted radiance or radiance emitted from an air sample or other gas, the spectrometer must be calibrated to read intensities of emitted radiance in appropriate units of radiance or spectral radiance.

When an FTS is used as a spectro-radiometer for the remote measurement of emitted radiance, it becomes important to account for any stray radiance not pertinent to the radiance to be measured. The stray radiance is manifested principally by the self emission emanating from the various optical components and other surfaces of the interferometer part of the FTS system seen by the radiance detector.

As is well known, a scanning Michelson interferometer using a beam splitter assembly and mirror assemblies to provide interfering dual beams that generate an interferogram signal, combined with a computer to compute a Fourier transform of the generated interferogram, form the elements of a FTS. An analysis of the origins of the stray radiance or self emission in an FTS shows that it comes principally from the self emission of the output side of the scanning Michelson interferometer streaming in the opposite direction of the incoming radiance.

U.S. Pat. No. 6,233,054 (the '054 patent) describes a dual beam, that is four port, interferometer with a symmetrical beamsplitter configuration that is said to suppress its self emission when there is precise symmetry about the center of the beamsplitter assembly. The symmetrical beamsplitter configuration of the '054 patent is formed of an optically thin layer of air squeezed between two relatively thick identical substrates that each have a relatively high index of refraction so that the constructive interference sum of several Fresnel reflections within an air gap of specified width will add up to close to a 50% reflection with the remainder transmitted. With this precise symmetry of the four port interferometer there is said to be precise suppression of self emission even in the case of absorption in the substrates or anti-reflection coatings by virtue of these terms being equal and opposite in sign for their interference amplitudes. The airgap between the two high index substrates in the beamsplitter assembly should be $\lambda/4$ to achieve close to 50% reflection with the remainder transmitted.

The external face of each substrate in the dual beam interferometer described in the '054 patent is covered with an antireflective coating. The coating on the outer surface of each substrate must be identical broadband antireflection coatings. Such antireflective coatings are a complex combination of several layers of dielectric material with various indices of refraction and absorptivities. The challenge in manufacturing such substrates is to avoid mismatches in the thickness of the two substrates and to have their faces parallel to each other. Any mismatch in parallelism leads to a built-in misalignment of the interferometer.

SUMMARY OF THE INVENTION

A four port Michelson interferometer has a first input port viewing a first field of view having spectral radiance and a second input port viewing a second field of view having spectral radiance; and a non-symmetrical single substrate beamsplitter assembly having first and second opposed faces. The non-symmetrical single substrate beamsplitter assembly is arranged such that incident spectral radiance from both the first and second input ports are split at the first face of the non-symmetrical single substrate beamsplitter assembly and combined, after traversing separate optical paths. Each of the separate optical paths contain a retro-reflector where at least one retro-reflector is movable in order to carry out Fourier transform spectral analysis on the second face of the non-symmetrical single substrate beamsplitter assembly. The Fourier transform spectral analysis includes the interferometer performing a direct optical subtractive comparison of the spectral radiance of the second field of view against the spectral radiance of the first field of view having complete absence of self-emitted spectral radiance of the four port interferometer.

A spectro-radiometer system has a four port Michelson interferometer. The interferometer has a first input port viewing a first field of view having spectral radiance and a second input port viewing a second field of view having spectral radiance; and a non-symmetrical single substrate beamsplitter assembly fabricated from infrared optical material that consists of ZnSe that has a predetermined low absorptivity and low emissivity in a predetermined wavelength interval with the non-symmetrical single substrate beamsplitter assembly having negligible self-emission arising from the predetermined low absorptivity. The system also has two retro-reflector assemblies positioned such that a splitting of an input light beam occurs on one face of the non-symmetrical single substrate beamsplitter assembly and a subsequent combining of the split beam occurs on the second face of the non-symmetrical single substrate beamsplitter assembly. The Michelson interferometer performs a direct optical subtractive comparison of the second field of view against the first field of view to provide a difference in spectral radiance free from any self-emission contribution from the non-symmetrical single substrate beamsplitter assembly by virtue of the negligible emissivity of dude in a predetermined spectral region.

A spectro-radiometer system for remotely and quantitatively measuring surface emitted radiance has a our port Michelson interferometer that has a first input port viewing a first field of view and a second input port viewing a second field of view; and a non-symmetrical single substrate beamsplitter assembly fabricated from infrared optical material that consists of ZnSe that has a predetermined negligible absorptivity in a predetermined wavelength interval with the non-symmetrical single substrate beamsplitter assembly having negligible self-emission arising from the predetermined negligible absorptivity. The Michelson interferometer performing when measuring the quantitative determination of surface emitted radiance a direct optical subtractive comparison of said second field of view against said first field of view to provide a difference in spectral radiance free from any self-emission contribution from the non-symmetrical single substrate beamsplitter assembly by virtue of the negligible emissivity of ZnSe in a predetermined spectral region.

DETAILED DESCRIPTION

Figure 1:
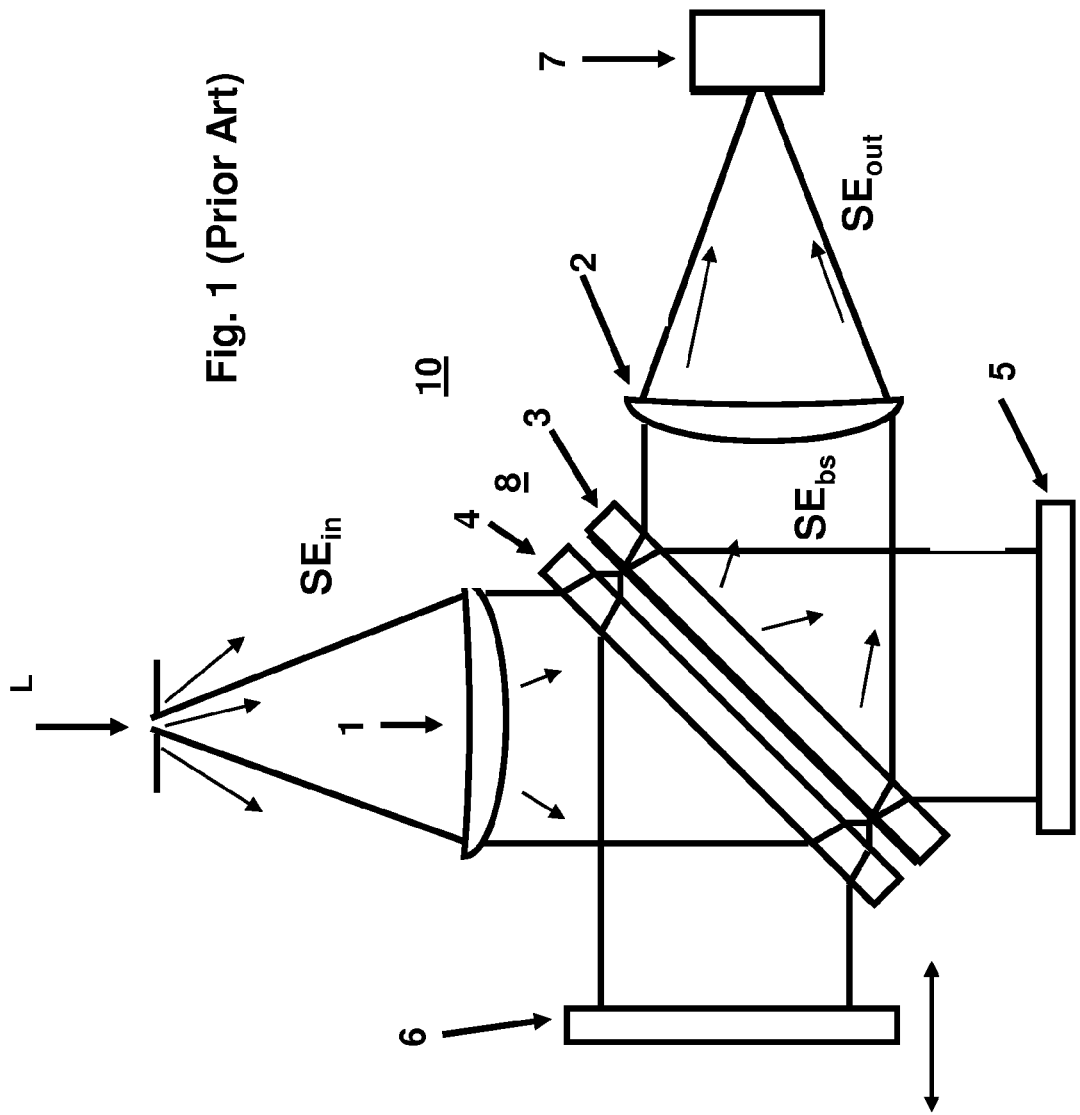
FIG. 1 shows a prior art single input beam output beam FTS with a scanning Michelson interferometer with a beamsplitter assembly that has a compensator substrate that insures equal phase delay for the reflected and transmitted beams.

As is shown in FIG. 1 and well known to those in this art, a standard single-input beam output beam Michelson interferometer 10 has input optics 1 for radiation L from a light source (not shown) and output optics 2 for a detector 7. The interferometer 10 also has a beamsplitter assembly 8 consisting of a transparent substrate 3 that supports a dielectric film that has the property of close to 50% reflection and 50% transmission, and a compensator substrate 4 that insures equal phase delay for the reflected and transmitted beams. The interferometer 10 further has a fixed mirror 5 and a moveable mirror 6. The mirror 6 is moveable a distance x/2.

The beamsplitter 3 and compensator 4, that is, the beamsplitter assembly 8, are at 45 degrees to the input beam L with a portion of that beam being transmitted through the assembly 8 to the fixed mirror 5, which is at normal incidence to that transmitted beam, and then reflected back to the beamsplitter assembly 8. A portion of the input beam L is reflected by the beamsplitter 3 to the moving mirror 6 which is also at normal incidence to that part of the beam. The moving mirror 6 reflects that portion of the input beam back to the beamsplitter 3 where it is recombined with the portion reflected by the fixed mirror 5 to provide an output beam which exits the output optics 2 and is detected by the detector 7. When mirror 6 is moved, the recombined beams interfere to produce as a function of path difference the interferogram signal needed to derive the spectral distribution of the radiant intensity via Fourier transformation.

FIG. 1 also shows the different components of self emission, namely, $SE_{in}$ the input optics self emission, $SE_{BS}$ the beamsplitter self emission and $SE_{out}$ the output optics self emission.

Figure 2:
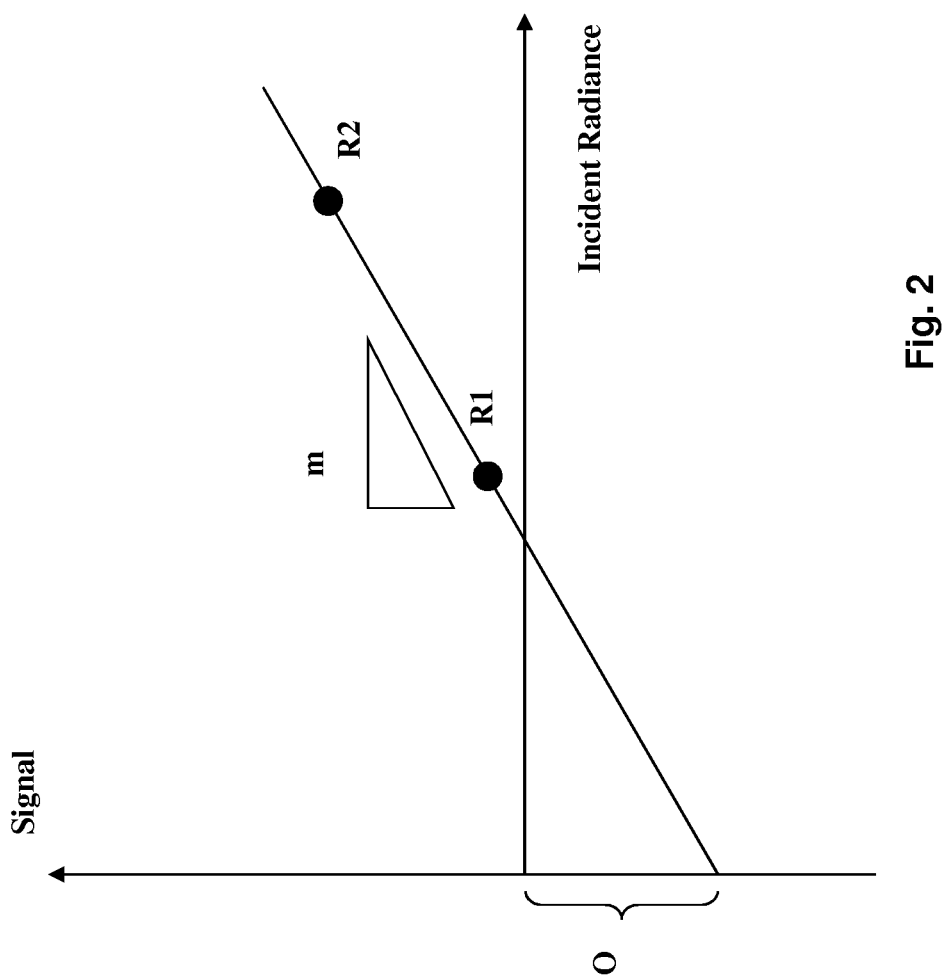
FIG. 2 illustrates graphically the calibration procedure for the interferometer shown in FIG. 1.

Stray radiance in the long wave infrared part of the spectrum not pertinent to the radiance to be measured such as the self emission encountered in a common FTS as illustrated in FIG. 1 can be accounted for by a calibration procedure illustrated graphically in FIG. 2. As shown in FIG. 2, this procedure consists of first measuring for each infrared wavelength two different known sources of calibrated spectral radiance, identified in FIG. 2 by R1 and R2, such that both the radiometric response m and the radiometric offset o, also stated as stray radiance or self emission, can be determined. The two sources of known spectral radiance typically consist of a so called black-body source at two different temperature settings. The two parameters m and o are then used to determine the true spectral radiance of the target based on a measurement by the FTS. It is well known that the radiometric offset o or self emission of the FTS is very dependent on the temperature of the FTS and hence frequent calibration is required if the temperature is not constant.

An analysis of the origins of the stray radiance or self emission in an FTS shows that it comes principally from the self emission of the output side of the scanning Michelson interferometer streaming in the opposite direction of the incoming radiance. To reduce the effect of the back streaming self emission, the prior art FTS with two input ports and two output ports, that is shown in FIG. 3, may be used.

Figure 3:
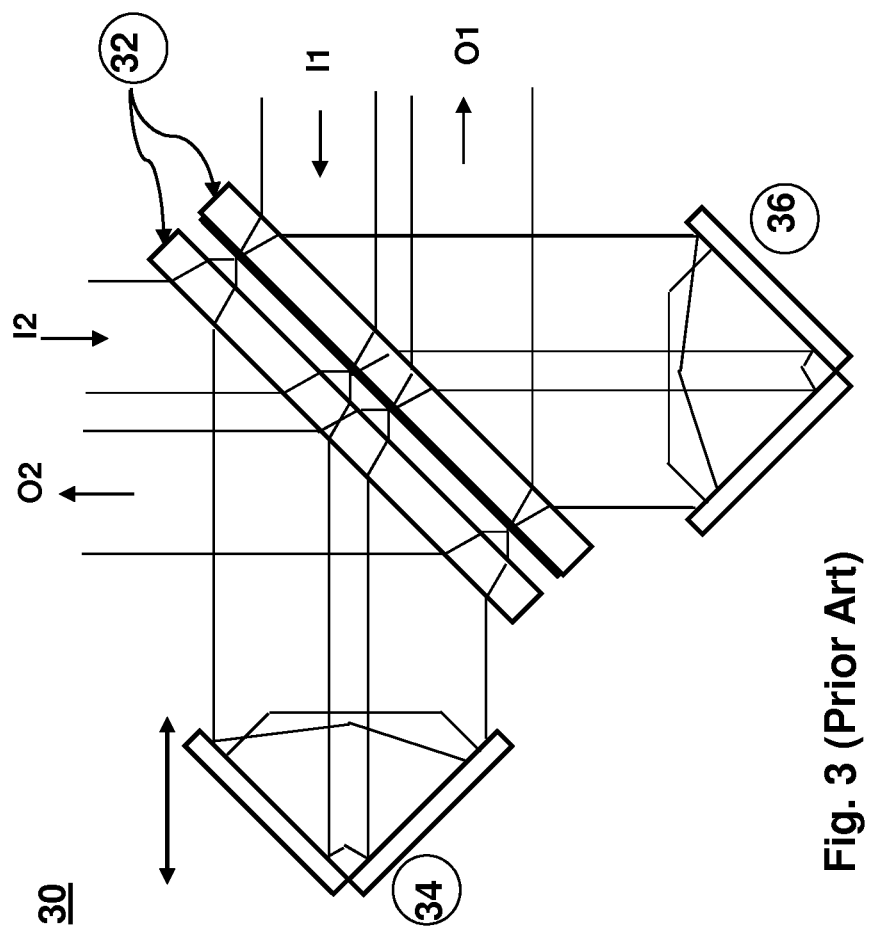
FIG. 3 shows a prior art four port FTS with a scanning Michelson interferometer.

The prior art four port FTS shown in FIG. 3, includes a scanning Michelson type interferometer 30 having a beamsplitter compensator assembly 32 positioned where optics, not shown, associated with an input port I1 directs a collimated beam of radiation onto one side of the beamsplitter compensator assembly 32 and optics, not shown, associated with an input port I2 which is close to port I1 directs a collimated beam of radiation from a direction at a right angle to the direction of I1 onto an opposite side of the beamsplitter compensator assembly 32. The interferometer 30 has substantially similar retro reflector assemblies 34 and 36 that replace the flat mirrors 5 and 6 shown in FIG. 1.

At least one of the retro reflector assemblies, 34 and 36, is movable in a direction parallel to that of the beam of radiation associated with that retro reflector. Assembly 34 is shown as movable in FIG. 3. The assemblies 34 and 36 each have the property of reflecting incident light back precisely 180 degrees to the associated incident beam and translated with respect to the center of symmetry of the retro-reflector assembly to produce an interferogram signal with the resulting output being directed outwards from the beamsplitter compensator assembly 32 by optics (not shown) towards a detector (not shown) that is positioned for example at output (O1). Thus each output beam is translated with respect to each input beam.

In order to permit two input beams to be processed to form interferogram signals at the same time, the beams must be incident on opposite sides of the beamsplitter assembly 32 such that after splitting they propagate parallel to each other. In order to receive the interfered beams at an output side, the mirror assemblies 34 and 36 not only reflect back the beams but also translate the beams so as to avoid returning the beam back to at least one of the inputs. The retro-reflection mirror assemblies 34 and 36 may be embodied as cube corner mirror assemblies or cat's eye mirror assemblies or roof top mirror assemblies. In a four port FTS such as the FTS shown in FIG. 3 where the input radiation enters a first input port (I1), the back streaming stray emission is greatly reduced when a low temperature target surface is placed at the second input port (I2).

Figures 4A, 4B:
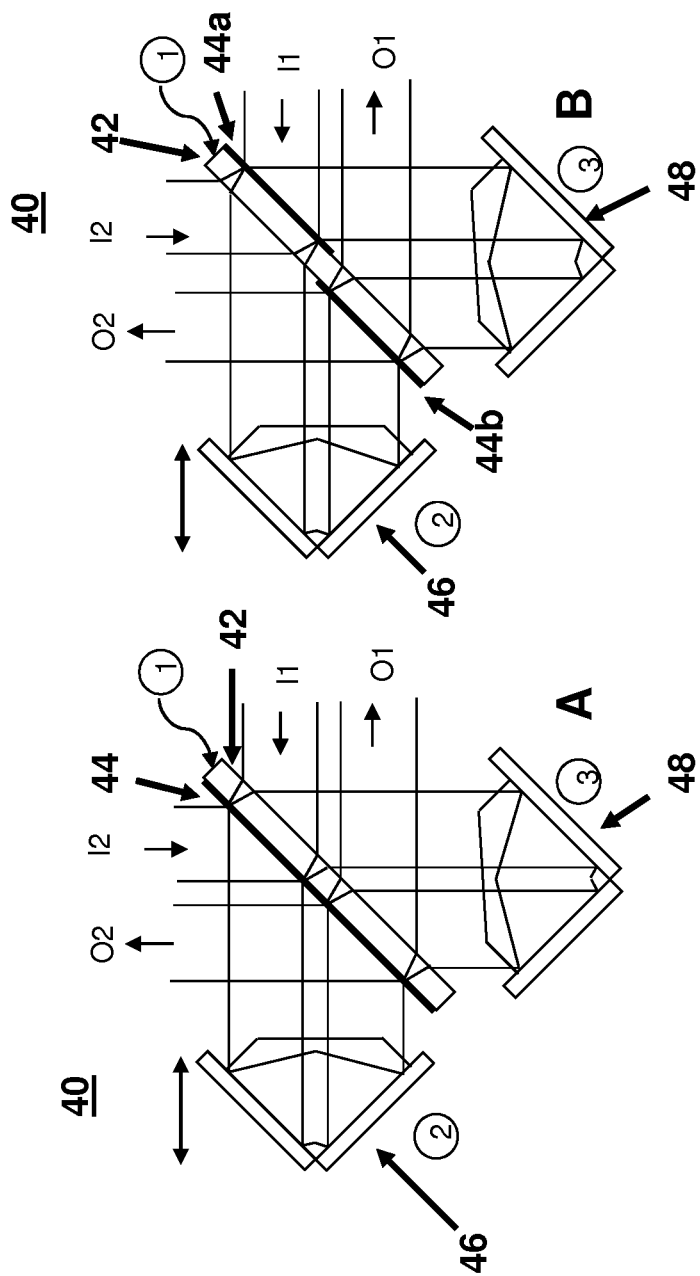
FIG. 4A shows a prior art uncompensated four port interferometer with a single beamsplitter substrate.
FIG. 4B shows a prior art compensated four port interferometer with a single beamsplitter substrate.

FIG. 4A shows a prior art four port interferometer 40 with a single beamsplitter substrate 42 without a compensator substrate with a splitting coating and combining coating 44 on the same side of the beamsplitter substrate 42. Light passing through and coming from retro-reflector 48 passes through the substrate 44 whereas light passing to and coming from retro-reflector 46 does not pass through the substrate 42. Thus interferometer 40 is uncompensated and has significant phase dispersion due to refractive dispersion only for one side of the interferometer and not for the other side. The translation capability described above of the retro-reflector assembly 46 permits positioning of the two retro-reflector assemblies 46 and 48 with respect to the beamsplitter assembly 42 such that the beams can be recombined at the same surface of the beamsplitter 42.

FIG. 4B, which has the same reference numerals as those used in FIG. 4A, shows a four port interferometer 40 with a single beamsplitter 42 as in FIG. 4A where the retro-reflectors 46 and 48 are positioned such that the splitting and combining of light occurs on opposite sides of the beamsplitter substrate 42. As is shown in FIG. 4B, the substrate 44 may have a coating 44*a* for splitting the beam on one half of one side of the substrate 42 and a coating 44*b* for combining the beam on the other half of the opposite side of the substrate 42. Since the number of traversals through the substrate 42 is the same for light passing to and coming from retro-reflectors 46 and 48, this interferometer 40 is self compensated for refractive dispersion because the optical path through the substrate 44 is the same for both sides without the need for an additional compensator substrate.

In contrast to the foregoing, the beamsplitter of the present invention is a single plate uncoated substrate.

Figure 5:
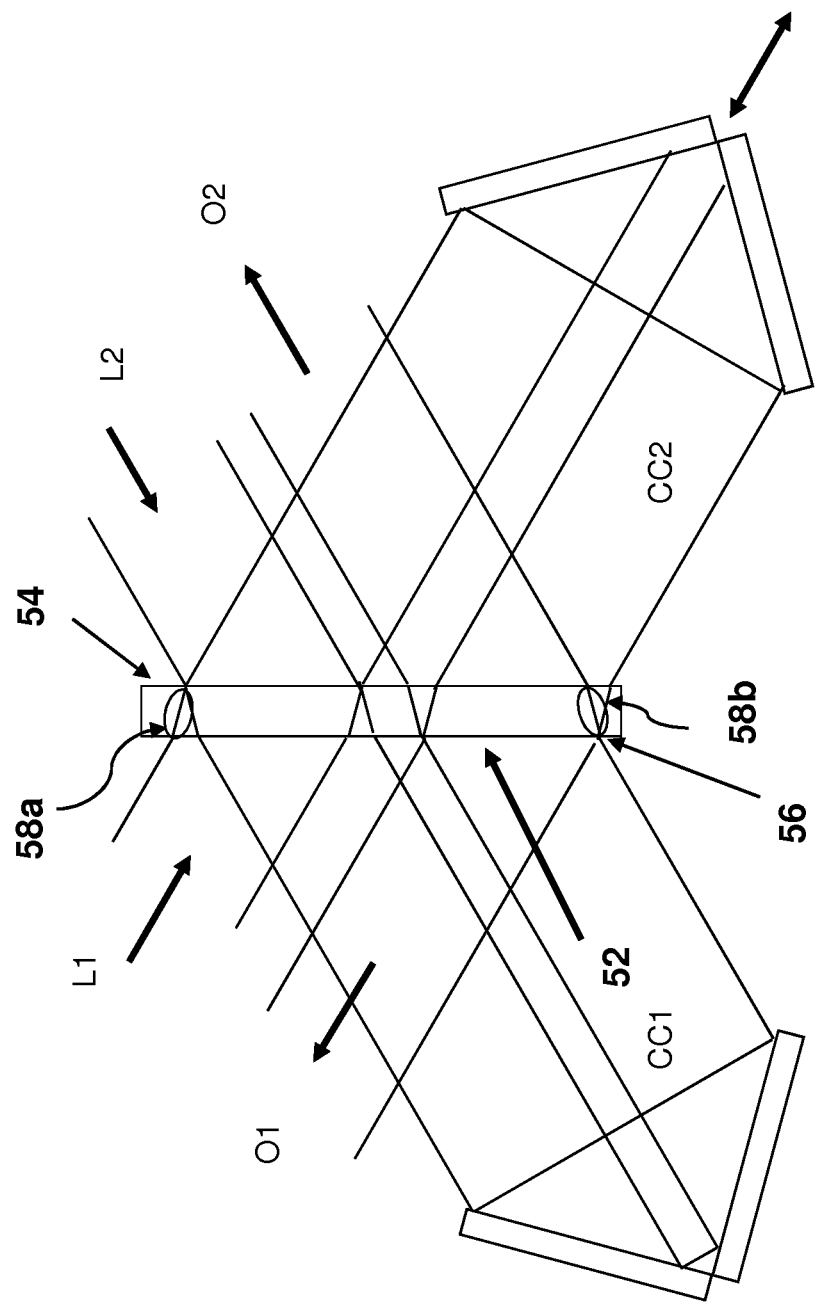
FIG. 5 shows an interferometer that has a beamsplitter substrate embodied according to this disclosure.

Referring now to FIG. 5, there is shown an interferometer 50 that has a beamsplitter substrate 52 embodied as described below and two retro-reflector assemblies CC1 and CC2. As is shown in FIG. 5, collimated light L1 from a first input port, not shown, is incident on the left side of the beamsplitter substrate 52 at a specified angle. At the same time, collimated light L2 from a second input port, also not shown, is incident on the right side of the beamsplitter surface at the same angle as L1.

As is shown in FIG. 5, the transmitted beam of L2 is superimposed on the internally reflected beam of L1. Inversely the transmitted beam of L1 is superimposed on the externally reflected beam of L2. Because of this superimposing of the transmitted beams on the reflected beams, the upper right hand surface part 54 of the substrate 52 is known as the input splitting surface.

The retro-reflector assemblies CC1 and CC2 are arranged such that the combined parts of beams L1 and L2 reflected by retro-reflector CC1 back to the lower part of the beamsplitter substrate and transmitted through the beamsplitter substrate 52 to output O2 is superimposed on the combined parts of beams L1 and L2 reflected by retro-reflector CC2 back to same lower part of the beamsplitter substrate 52 and internally reflected at the lower left surface of the beamsplitter substrate 52 to output O2. This superimposing of the reflected combined parts of beams L1 and L2 by CC1 and CC2 to the same lower part of the beamsplitter substrate 52 defines the left lower surface 56 of the beamsplitter substrate 52 as the output combining surface and sends the combined light to output O2. Similarly the combined parts of beams L1 and L2 reflected by retro-reflector CC1 and externally reflected at the lower left surface 56 of the beamsplitter substrate 52 is superimposed on the combined parts of beams L1 and L2 reflected by CC2 and transmitted through the lower part of the beamsplitter substrate 52 sends the combined beams to output O1.

Precise symmetry between the CC1 and CC2 sides of the interferometer 50 is achieved with two exceptions. The exceptions are at "58*a*" where an extra passage through the beamsplitter substrate 52 of input beam L1 with respect to input beam L2 occurs and at "58*b*" where an extra passage through the beamsplitter substrate 52 of output beam O2 with respect to output beam O1 occurs.

It is common knowledge that radiation in the long wave infrared is emitted by any opaque material that has limited reflectivity. The emitted radiation is related to the absolute temperature of the material. For infrared transparent materials, the emitted long wave infrared radiation is also a function of the spectral absorptivity of the material. In the absence of absorption, a material does not emit any long wave infrared radiation. To insure suppression of self emitted radiance due to the extra passages through the substrate 52, the beamsplitter substrate 52 is made from a material that has negligible absorption over a useful spectral range in the long wave infrared spectral domain.

There is no unbalance in self emission for the two input beams L1 and L2 due to the exceptions in precise symmetry shown in FIG. 5 at "58*a*" and "58*b*" when the beamsplitter substrate does not absorb infrared wavelengths.

Figure 6:
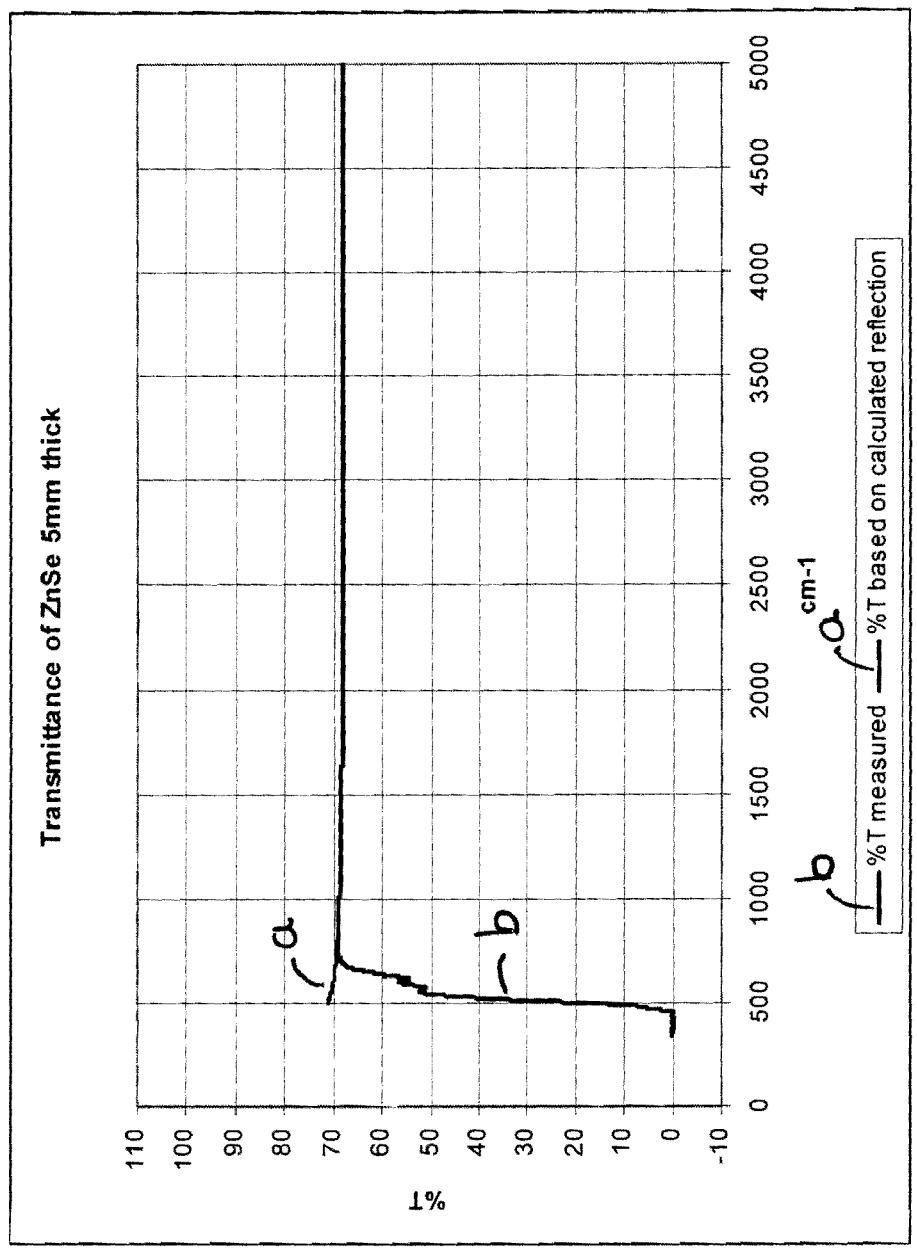
FIG. 6 shows a typical transmission loss for a ZnSe substrate.

Absorption in a substrate or absorptivity per cm of a substrate material as a function of wavelength can be determined by measuring the transmission loss of the substrate. FIG. 6 shows a typical transmission spectrum for a ZnSe substrate.

As is shown in FIG. 6, the apparent transmission loss is shown to be as much as 30%. However, the transmission loss measurement includes loss by Fresnel reflection. It can be shown, by a calculation based on knowledge of the index of refraction and by measurement that the loss of transmission due to reflection at the two faces of a ZnSe substrate accounts for virtually all the transmission loss for the infrared wavelength interval from 2 μm (5000 cm$^{-1}$) to 13 μm (770 cm$^{-1}$). Discounting the loss by reflection, the internal transmission loss is virtually zero in a ZnSe substrate over this wavelength range. While FIG. 6 is for a substrate that has a thickness of 5 mm, the thickness of the substrate is irrelevant to the apparent transmission loss shown in that figure. Similarly it is found that there are a number of other infrared transmitting materials that exhibit negligible internal transmission loss over substantial spectral intervals. Most of the actual data used in this calculation comes from a publicly available Thesis entitled "Spectral Characterization of Infrared Optical Materials and Filters" that was submitted for the degree of Doctor of Philosophy by Gary J. Hawkins December 1998 at the University of Reading, UK.

Figure 7:
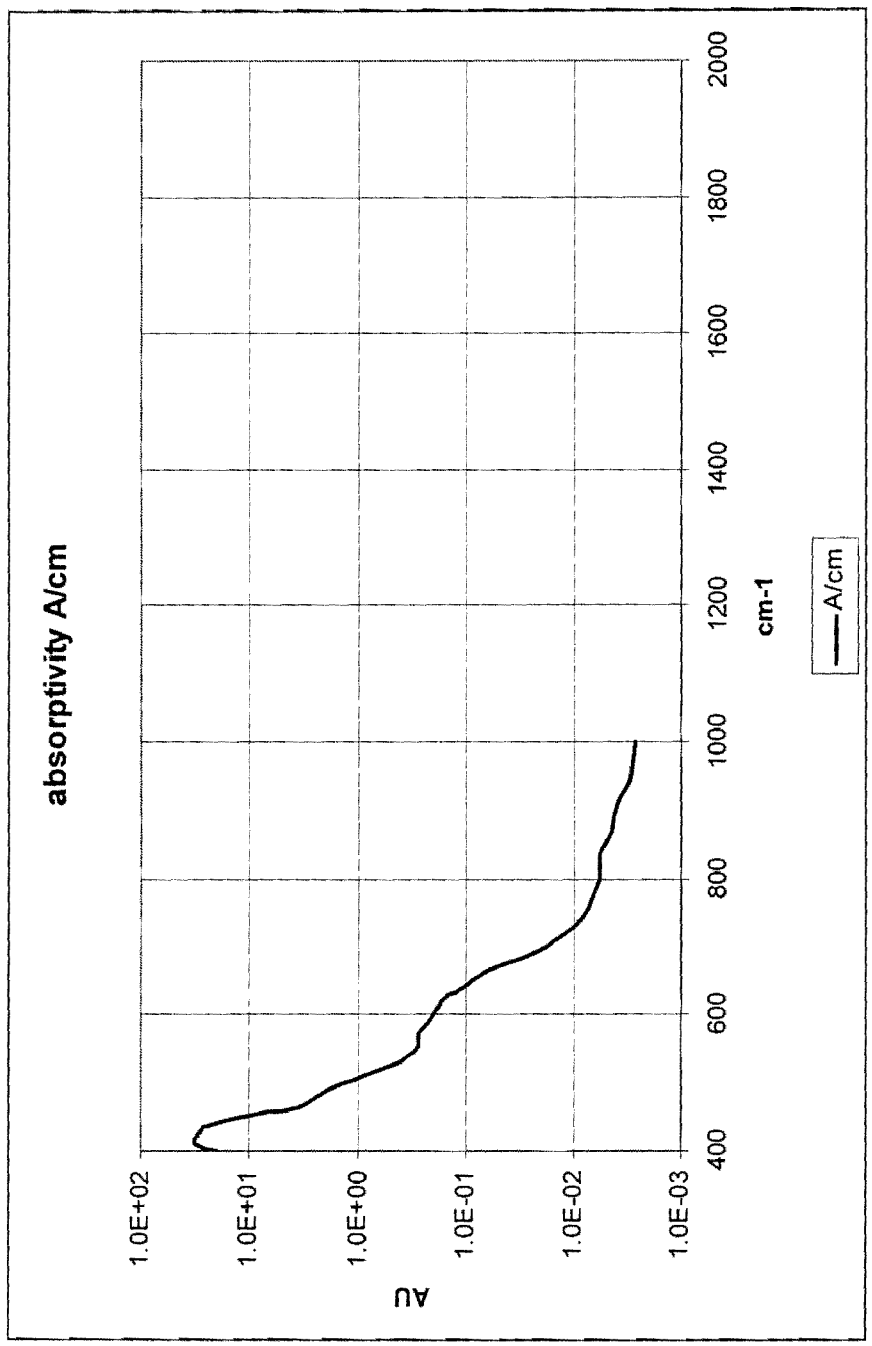
FIG. 7 shows a plot of absorptivity as a function of wavelength for ZnSe material in the region from 25 µm (400 cm$^{-1}$) to 10 µm (1000 cm$^{-1}$).

FIG. 7 shows a plot of absorptivity as a function of wavelength for ZnSe material in the region from 25 μm (400 cm$^{-1}$) to 10 μm (1000 cm$^{-1}$). As is shown in FIG. 7, there is a transition from strong absorption at 400 cm$^{-1}$ to very weak absorption at 1000 cm$^{-1}$. The absorption per cm of material is less than 1% above 750 cm$^{-1}$ and while not shown in FIG. 7 less than 0.4% above 1000 cm$^{-1}$ and up to at least 5000 cm$^{-1}$. Therefore, the absorptivity is negligible from 2 μm (5000 cm$^{-1}$) to 13 μm (770 cm$^{-1}$) in the infrared.

Therefore, suppression of self emission in a four port scanning Michelson interferometer is achieved herein using a single substrate beamsplitter without the need for precise symmetry in the beamsplitter assembly by using for the beamsplitter substrate infrared optical materials that have negligible absorptivity in a substantial and useful wavelength interval.

The need to use the prior art reflection enhancing dielectric coatings in a four port scanning Michelson interferometer with a single substrate beamsplitter as shown in FIG. 5 is avoided by using the high reflectivity property of high index of refraction infrared transparent materials such as those from the family of ZnSe, ZnS, CdS, CdTe, Silicon, Germanium or Diamond, to implement the beamsplitters.

The range of index of refraction of the materials described above provides for Fresnel reflection intensity such that adequate beam-splitting efficiency is achieved without the need for any coatings. Multiple additive splitting of the incident radiation and consequent multiple additive beam combining of the output radiation enhances the efficiency of the beam-splitting.

Figure 8:
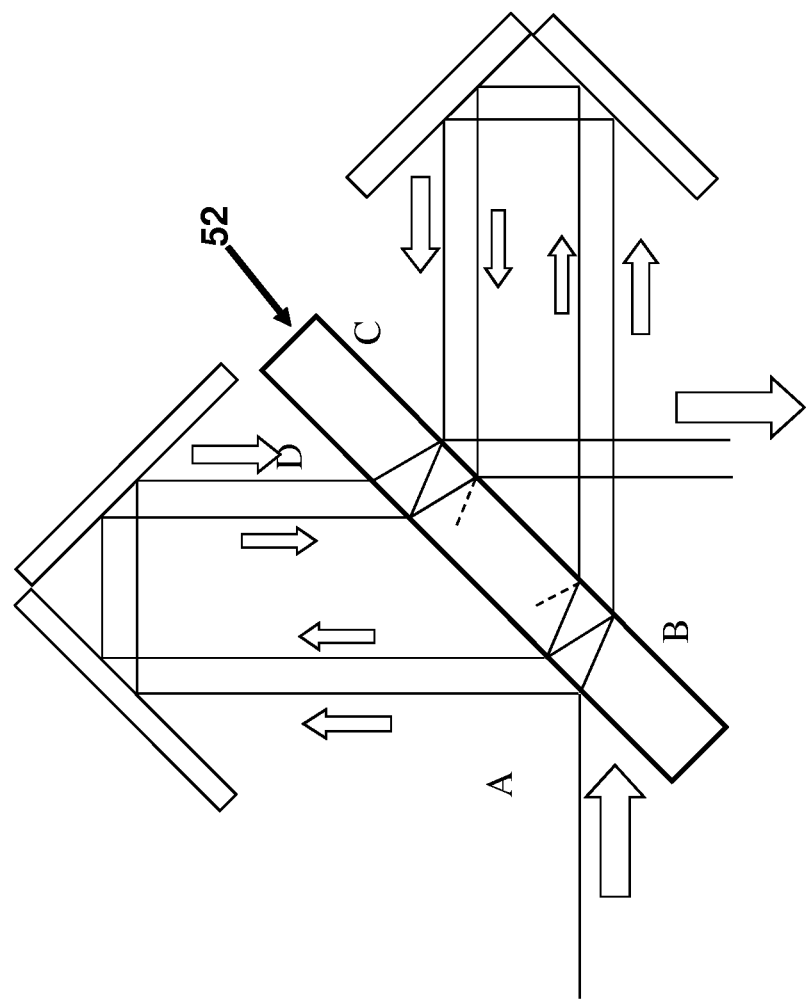
FIG. 8 illustrates the principle of enhanced additive splitting and combining for an uncoated single substrate.

FIG. 8 illustrates the principle of enhanced additive splitting and combining for an uncoated single substrate. A beam split at A is combined at C. The component of the beam transmitted at A is split again at B and its reflected component is combined at D and adds coherently to the beam split at A and combined at C. Further splittings and combinations occur but their intensities diminish quickly. The additional splittings and combinations are symmetrical between inputs L1 and L2 as well as at outputs O1 and O2 shown in FIG. 5. As a result there is no increase in self emission unbalance due to the increasing optical path in the substrate 52 undergone by the enhanced multiple splittings and combinations.

Figure 9:
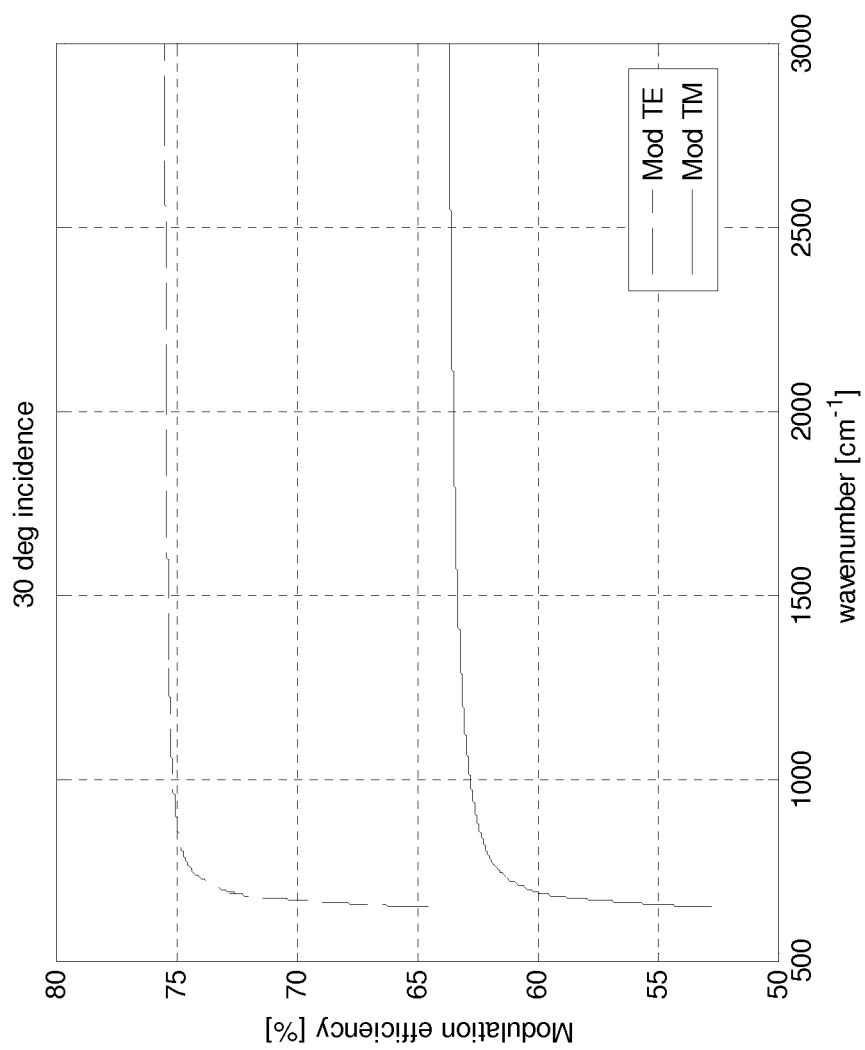
FIG. 9 shows the calculated beam-splitting efficiency for an uncoated single substrate beamsplitter arranged in a refractive dispersion compensated interferometer configuration based on the optical properties of ZnSe and for the case where the light beams are incident at 30 degrees on the substrate.

FIG. 9 shows the calculated beam-splitting efficiency for an uncoated single substrate beamsplitter arranged in a refractive dispersion compensated interferometer configuration based on the optical properties of ZnSe and for the case where the light beams are incident at 30 degrees on the substrate. As is shown in FIG. 9, the efficiency is highly uniform over a wide spectral range. The rapid drop off in efficiency below 750 cm$^{-1}$ is the result of the onset of internal absorption in a 0.5 cm thick substrate.

Another embodiment for a four port scanning Michelson interferometer uses a single substrate beamsplitter consisting of a low index of refraction infrared transparent material such as material from the family of KBr, KCl, NaCl, CsI, BaF, CaF . . . . Such a substrate requires reflection enhancing dielectric coatings in the splitting and combining areas of the substrate on opposite sides of the substrate as shown in FIG. 4B. In order to achieve precise subtractive suppression of self emission these coatings must also have negligible absorption in a useful spectral range in the long wave infrared. The parts of the surfaces not used for splitting or combining may be left without any coating or provided with anti-reflection coatings.

The single substrate beamsplitter described herein can be employed in a scanning Michelson interferometer implementation suitable for an FTS system used for the remote quantitative determination of the surface emitted radiance or radiance emitted from an air sample or other gas. Since the beamsplitter suppresses self emission of the interferometer assembly this simplifies the radiometric calibration procedure for the FTS system. More specifically, the FTS system is used in the dual input port mode where one input views a reference field of view against which the second input port permits direct optical subtractive comparison of a second field of view against the reference field of view providing the difference in spectral radiance as the measure.

Figure 10:
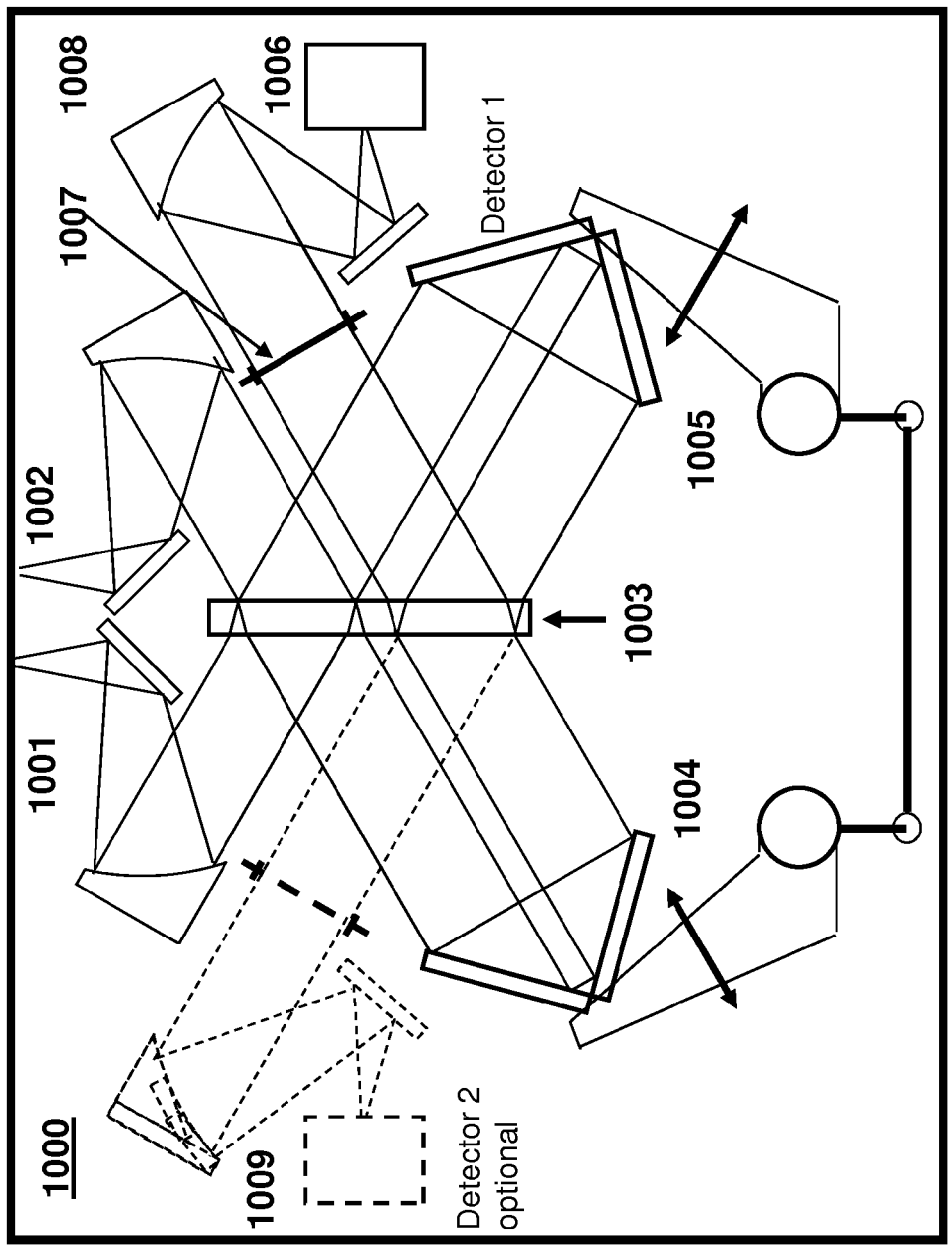
FIG. 10 shows a FTS system used in the dual input port mode with a single substrate beamsplitter embodied according to this disclosure suitable for an FTS system used for the remote quantitative determination of the surface emitted radiance or radiance emitted from an air sample or other gas.

FIG. 10 shows a schematic diagram of such a scanning dual input Michelson interferometer 1000. As shown therein, the two retro-reflector assemblies, 1004 and 1005 are positioned such that the splitting of an input light beam occurs on one side of the single substrate beamsplitter 1003 while the subsequent combining of the split beams occurs on the opposite side of the beamsplitter substrate 1003. This provides for an interferometer 1000 which is compensated for refractive dispersion. The input optics of the interferometer 1000 shown in FIG. 10 are arranged for subtractive two input port spectroradiometry such that the field of view of input 1001 is adjacent to but not superimposed on the field of view of input 1002. Further, FIG. 10 shows a placement for a control aperture and baffle 1007 that insures that the radiance detector 1006 views a controlled field of view that minimizes self emission from structural parts of the interferometer that are not suppressed by the four port design. FIG. 10 also shows as a dashed line box an optional second detector 1009. The detector 1009 allows interferometer 1000 to use two different detectors 1006 and 1009 that are each optimized for best sensitivity in two different spectral regions.

An evaluation of the beamsplitter described herein was carried out using an MR300 FTIR manufactured by ABB Bomem. The MR300 normally has a four port scanning Michelson interferometer as well as access to two input ports. It was provided with an uncoated ZnSe single substrate beamsplitter 1003 as well as a baffle 1007 as shown schematically in FIG. 10. In a first test configuration, a simplified input optics was used whereby two flat mirrors were placed in the collimated input beams to direct both beams to the same variable blackbody source.

Figure 11:
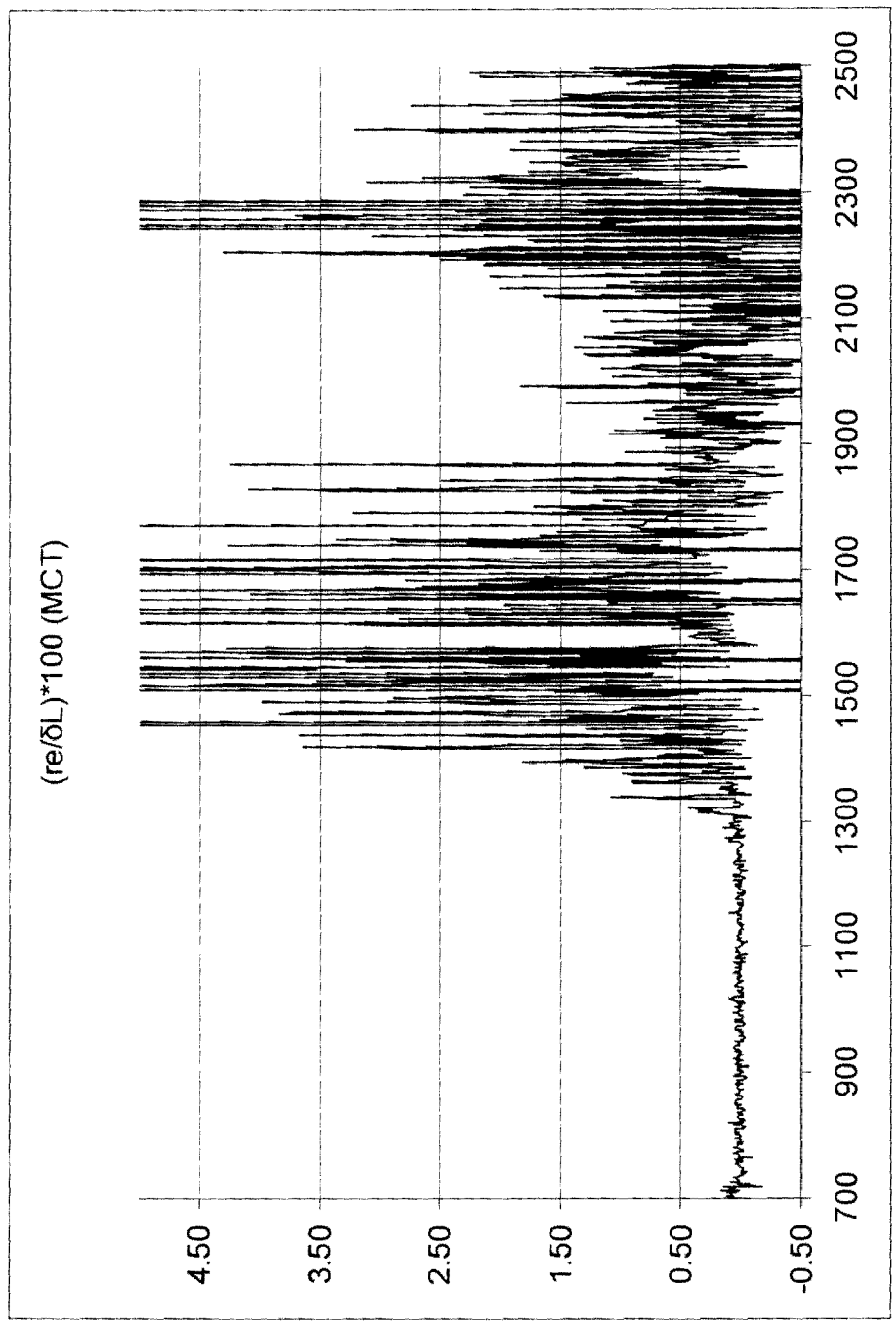
FIG. 11 shows for the FTS system shown in FIG. 10 the residual spectrum normalized as a percentage of the source blackbody spectral radiance.

FIG. 11 shows the residual spectrum normalized as a percentage of the source blackbody spectral radiance which corresponds to a Planck distribution for its temperature setting of 47 degrees Celsius. It can be seen that the residual percentage is very low in the spectral region from 700 to 1300 cm$^{-1}$. Above 1300 cm$^{-1}$ is seen a spectral signature typically observed for water vapor in air. The non-zero water vapor signature residual arises when the optical path in humid air from the blackbody source to each input port is not equal.

As is described in more detail below, the inventor herein attempted to implement in practice a dual beam interferometer with a beamsplitter assembly as described in the '054 patent that completely suppresses its self-emission and found that there are several drawbacks to that implementation. For high beam-splitting efficiency, the two identical substrates described in the patent must have substantial Fresnel reflection at the airgap interface. This means that there will be substantial Fresnel reflection loss at the outer surfaces of the identical substrates. The need for effective, and identical, broadband antireflection coatings on the outer surfaces of the identical substrates is unavoidable. As was previously described, broadband antireflection coatings generally are a complex combination of several layers of dielectric material with various indices of refraction and absorptivities. Therefore, it is a challenge to achieve broadband antireflection coatings that have precisely identical optical transmittance and reflectance.

Figure 12:
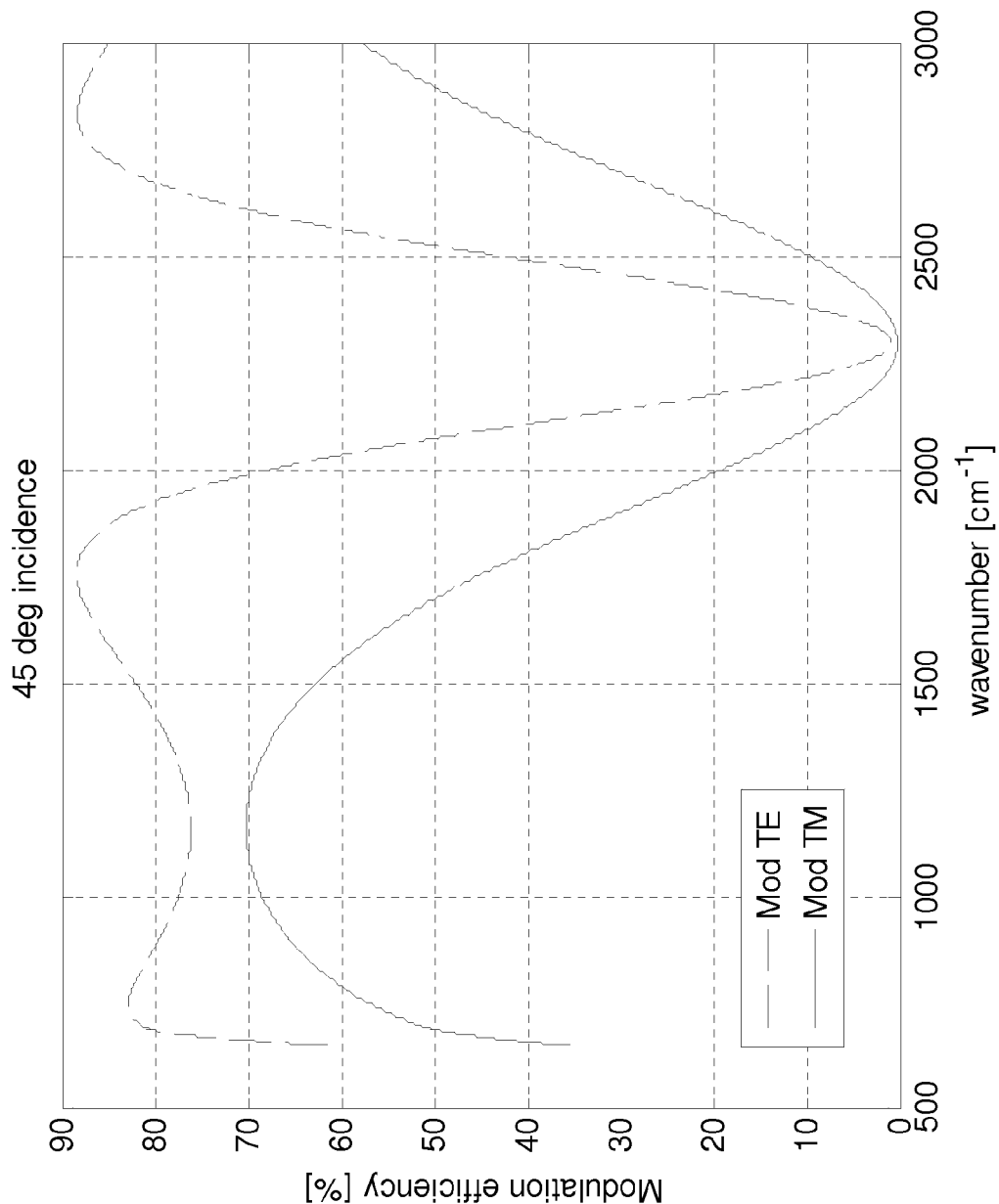
FIG. 12 shows the beamsplitter efficiency of a prior art beamsplitter.

Any absorptivity difference between the two substrates described in the '054 patent whether due to imprecise thickness matching of the substrates and their inherent absorptivity or due to non-identical antireflection coatings will lead to an unbalance in beamsplitter self emission and hence incomplete suppression of self emission. Furthermore if the substrates and their antireflection coatings are identical but have some residual absorptivity, there may occur an unbalance in beamsplitter self emission if their temperatures are different. Further, as shown in FIG. 12, the beam-splitting efficiency of the airgap of the beamsplitter of the '054 patent is quite variable with wavelength and diminishes to zero where the airgap is $\lambda/2$.

FIG. 10c of the '054 patent shows the measured residual self emission of an FTS system, called CATSI, for Compact Atmospheric Sounding Interferometer, constructed in accordance with the invention described in that patent. The '054 patent says that the residual self emission was not zero but instead was found to be "usually smaller than 2% in the spectral region from 700 to 3000 $cm^{-1}$" where the beamsplitter pair made from ZnSe is expected to have low absorptivity (as is shown in FIG. 9 for the transmission property of ZnSe). As the '054 patent also says in the region from 500 to 700 $cm^{-1}$ there was an unexpectedly stronger residual. In this spectral region, ZnSe has significant absorptivity as shown in FIG. 10. These stronger than expected residuals were attributed to both imperfect thickness matching of the two substrates which was specified to +/−25 micrometer tolerance and mismatching of the antireflection coatings. According to the theory developed in detail in the '054 patent the phase between the interferogram signal of input 1 should be 180 degrees with respect to the interferogram signal from input 2, that is, inverted so that they cancel. The '054 patent says that in practice, "phase differences other than 180 degrees appear in the spectral region of strong substrate disymmetries between 530 and 680 $cm^{-1}$."

As described above, the inventor herein attempted to implement an improved version of the CATSI instrument as described in the '054 patent. After modeling the tolerances required to provide the suppression of self emission to an adequate level it was found too difficult to manufacture the matching pair of beamsplitter substrates in accordance with the description of the '054 patent.

Even though the implementation of the beamsplitter described herein does not maintain the precise symmetry described in the '054 patent, the self emission of the beamsplitter is precisely balanced by virtue of absence of absorptivity over a substantial wavelength range of commonly available substrate materials. Furthermore, the self emission balance is more readily achieved because 1) No thickness matching between two substrates is required, 2) there are no requirements for identical coatings; neither for reflection enhancement coatings nor for antireflection coatings, 3) for one of the embodiments no dielectric coatings of any kind are required providing uniform efficiency over a very wide spectral range. 4) There is no need for temperature matching of two substrates.

It is to be understood that the description of the foregoing exemplary embodiment(s) is(are) intended to be only illustrative, rather than exhaustive, of the present invention. Those of ordinary skill will be able to make certain additions, deletions, and/or modifications to the embodiment(s) of the disclosed subject matter without departing from the spirit of the invention or its scope, as defined by the appended claims.

What is claimed is:

1. A four port Michelson interferometer comprising:
a first input port viewing a first field of view having spectral radiance and a second input port viewing a second field of view having spectral radiance; and
a non-symmetrical single substrate beamsplitter assembly having first and second opposed faces, said non-symmetrical single substrate beamsplitter assembly arranged such that incident spectral radiance from both the first and second input ports are split at said first face of the non-symmetrical single substrate beamsplitter assembly and combined, after traversing separate optical paths, each of said separate optical paths containing a retro-reflector where at least one retro-reflector is movable in order to carry out Fourier transform spectral analysis on said second face of the non-symmetrical single substrate beamsplitter assembly, said Fourier transform spectral analysis comprising:
said interferometer performing a direct optical subtractive comparison of the spectral radiance of said second field of view against the spectral radiance of said first field of view having complete absence or self-emitted spectral radiance of the four port interferometer.

2. The interferometer of claim 1 wherein said non-symmetrical single substrate beamsplitter assembly first face comprises a splitting area and said second face comprises a combining area and reflection enhancing dielectric coatings on said splitting and combining areas.

3. The interferometer of claim 1 wherein said non-symmetrical single substrate beamsplitter assembly comprises a splitting area on one half of said first face and a combining area on one half of said second face, and reflection enhancing dielectric coatings on said splitting and combining areas.

4. The interferometer of claim 3 wherein the other half of each of said first and said second faces are provided with anti-reflection coatings.

5. The four port interferometer of claim 1 wherein the non-symmetrical single substrate beamsplitter assembly is fabricated from material that consists of ZnSe where the spectral range of high transmittance and low emissivity is from 770 cm-1 (13 um) to over 5000 cm-1 (2um).

6. The four port interferometer of claim 5 wherein the non-symmetrical single substrate beamsplitter assembly is used for splitting the spectral radiance without use of any splitting dielectric coatings.

7. A spectro-radiometer system comprising:
a four port Michelson interferometer comprising:
a first input port viewing a first field of view having spectral radiance and a second input port viewing a second field of view having spectral radiance; and a non-symmetrical single substrate beamsplitter assembly fabricated from infrared optical material that consists of ZnSe that has a predetermined low absorptivity and low emissivity in a predetermined wavelength interval, said non-symmetrical single substrate beamsplitter assembly having negligible self-emission arising from said predetermined low absorptivity; and two retro-reflector assemblies positioned such that a splitting of an input light beam occurs on one face of said non-symmetrical single substrate beamsplitter assembly and a subsequent combining of said split beam occurs on said second face of said non-symmetrical single substrate beamsplitter assembly;

said Michelson interferometer performing a direct optical subtractive comparison of said second field of view against said first field of view to provide a difference in spectral radiance free from any self-emission contribution from the non-symmetrical single substrate beamsplitter assembly by virtue of the negligible emissivity of ZnSe in a predetermined spectral region.

8. The interferometer of claim 7 wherein said non-symmetrical single substrate beamsplitter assembly is an uncoated substrate.

9. The interferometer of claim 7 wherein said predetermined wavelength interval is from 2 μm (5000 cm$^{-1}$) to 13 μm (770 cm$^{-1}$) in the infrared.

10. A spectro-radiometer system for remotely and quantitatively measuring surface emitted radiance comprising:

a four port Michelson interferometer comprising:

a first input port viewing a first field of view and a second input port viewing a second field of view; and a non-symmetrical single substrate beamsplitter assembly fabricated from infrared optical material that consists of ZnSe that has a predetermined negligible absorptivity in a predetermined wavelength interval, said non-symmetrical single substrate beamsplitter assembly having negligible self-emission arising from said predetermined negligible absorptivity;

said Michelson interferometer performing when measuring said quantitative determination of surface emitted radiance a direct optical subtractive comparison of said second field of view against said first field of view to provide a difference in spectral radiance free from any self-emission contribution from the non-symmetrical single substrate beamsplitter assembly by virtue of the negligible emissivity of ZnSe in a predetermined spectral region.

11. The interferometer of claim 10 wherein said non-Symmetrical single substrate beamsplitter assembly is an uncoated substrate.

12. The interferometer of claim 10 wherein said predetermined wavelength interval is from 2 μm (5000 cm$^{-1}$) to 13 μm (770 cm$^{-1}$) in the infrared.

* * * * *